United States Patent
Singh et al.

(10) Patent No.: US 7,653,075 B2
(45) Date of Patent: *Jan. 26, 2010

(54) PROCESSING COMMUNICATION FLOWS IN ASYMMETRICALLY ROUTED NETWORKS

(75) Inventors: Balraj Singh, Los Altos, CA (US); Nitin Gugle, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 464 days.

This patent is subject to a terminal disclaimer.

(21) Appl. No.: 11/434,416

(22) Filed: May 15, 2006

(65) Prior Publication Data
US 2006/0268932 A1 Nov. 30, 2006

Related U.S. Application Data

(60) Provisional application No. 60/684,008, filed on May 23, 2005.

(51) Int. Cl.
*H04L 12/28* (2006.01)
*H04L 12/56* (2006.01)

(52) U.S. Cl. ............... 370/401; 370/389; 370/392; 370/351; 370/395.2; 370/395.21; 370/395.3; 370/395.31; 370/395.32; 370/395.4; 370/395.41; 370/395.42; 370/395.43; 370/395.5; 370/395.51; 370/395.52; 370/395.53; 370/395.54; 370/395.6; 370/395.61; 370/395.62; 370/395.63; 370/395.64; 370/395.65; 370/395.7; 370/395.71; 370/395.72

(58) Field of Classification Search . 370/395.1–395.72, 370/396–399, 351, 389, 392, 401
See application file for complete search history.

(56) References Cited

U.S. PATENT DOCUMENTS 5,673,263 A * 9/1997 Basso et al. .................. 370/396
5,682,479 A * 10/1997 Newhall et al. ............. 709/242

(Continued)

FOREIGN PATENT DOCUMENTS

WO  WO 01/39435 A2  5/2001
WO  WO 2006/102196 A2  9/2006

OTHER PUBLICATIONS

European Search Report dated Dec. 19, 2007, for corresponding European Application No. 06114191.7, 7 pgs.

*Primary Examiner*—Daniel J Ryman
*Assistant Examiner*—Andrew Oh
(74) *Attorney, Agent, or Firm*—Shumaker & Sieffert, P.A.

(57) ABSTRACT

A network system includes a first device and a second device separated by a network having asymmetric routes in which traffic forwarded in a first direction from the first device to the second device may travel a different route than traffic forwarded in a second direction from the second device to the first device. At least three intermediate processing devices are located between the first device and the second device, wherein at least two of the intermediate processing devices are located along different asymmetric routes. The intermediate processing devices intercept a communication flow between the first device and the second device, and encapsulate the communication flow within network tunnels so that communications associated with the communication flow in the first direction and the second direction are forwarded between a same set of at least two of the intermediate processing devices.

8 Claims, 4 Drawing Sheets

U.S. PATENT DOCUMENTS

| | | | |
|---|---|---|---|
| 6,122,759 A * | 9/2000 | Ayanoglu et al. | 714/57 |
| 6,240,462 B1 * | 5/2001 | Agraharam et al. | 709/238 |
| 6,628,632 B1 * | 9/2003 | Dolan | 370/332 |
| 6,643,287 B1 * | 11/2003 | Callon et al. | 370/392 |
| 6,785,277 B1 * | 8/2004 | Sundling et al. | 370/392 |
| 6,801,949 B1 * | 10/2004 | Bruck et al. | 709/232 |
| 6,822,963 B1 * | 11/2004 | Kavak | 370/395.21 |
| 6,999,434 B1 * | 2/2006 | Agrawal et al. | 370/331 |
| 7,035,240 B1 * | 4/2006 | Balakrishnan et al. | 370/338 |
| 7,200,149 B1 * | 4/2007 | Hasty, Jr. | 370/400 |
| 2003/0031185 A1 * | 2/2003 | Kikuchi et al. | 370/400 |
| 2003/0088698 A1 | 5/2003 | Singh et al. | |
| 2004/0004955 A1 * | 1/2004 | Lewis | 370/351 |
| 2004/0151159 A1 * | 8/2004 | Xu | 370/351 |
| 2005/0025150 A1 * | 2/2005 | Helmy et al. | 370/392 |
| 2005/0094557 A1 * | 5/2005 | Chen et al. | 370/229 |

* cited by examiner

PROCESSING COMMUNICATION FLOWS IN ASYMMETRICALLY ROUTED NETWORKS

This application claims the benefit of U.S. Provisional Application No. 60/684,008, filed May 23, 2005, the entire content of which is incorporated herein by reference.

TECHNICAL FIELD

The invention relates to computer networks, and for example, to processing data flows in computer networks having asymmetric communication data paths.

BACKGROUND

A typical computer network, such as an internet protocol (IP) network, supports communications between various network devices that may comprise personal computers, laptops, workstations, personal-digital assistants (PDAs), wireless devices, network-ready appliances, file servers, print servers, routers, or other devices. When two devices communicate, the devices establish a communication session using a communication protocol, such as the transmission control protocol (TCP). Devices, referred to as routers, forward packets associated with the communication session through the physical network that connects the devices. The flow of packets between the devices for a TCP session is commonly referred to as a TCP flow.

Various kinds of processing of the TCP flow can be done by intermediate devices placed along the path taken by packets that constitute the TCP flow. Some examples of the kinds of processing currently performed on TCP flow between devices include TCP acceleration, acceleration of an application-layer software application using TCP, and intrusion detection.

However, one common requirement for effectively performing intermediate processing is to have all packets in each direction of the TCP flow pass through a single intermediate device that performs the processing. In networks with multiple paths, sometimes called asymmetrically routed networks, it is usually not possible to meet this requirement. In an asymmetrically routed network, a packet forwarded in a first direction between two communicating devices may traverse a different path from a packet forwarded between the devices in the opposite direction. That is, for the same TCP flow, packets from device A to device B may take one path through the network, but packets from device B to device A may take a different path. In this situation it is difficult to make use of a single intermediate device to perform processing on the TCP flow unless the intermediate device can be located before the split in the network routes.

SUMMARY

In general, the invention is directed to techniques for ensuring that packets associated with a network flow, such as a TCP flow, are forwarded between a set of intermediate processing devices located within an asymmetrically routed network regardless of the forwarding path. As a result, the intermediate processing devices of the set nevertheless have access to all packets associated with a given network flow, even if the intermediate processing devices are positioned after any split in the routed paths of the asymmetric network.

In one embodiment this is accomplished by overlaying tunnels across the asymmetric network with the intermediate processing devices. The intermediate devices source and terminate the tunnels, and transparently intercept and encapsulate packets for the same flow through the appropriate tunnels in order to ensure that related packets are directed to the same set of intermediate devices regardless of any asymmetric nature of the network. In this manner, the intermediate processing devices may perform network communication enhancement for TCP flows, such as increasing the security and/or efficiency of communications across the asymmetric network, even though the intermediate devices may be positioned after any split in the routed paths. Moreover, the techniques allow for individual tunneled packets to be routed to the source and termination of the tunnels along any of the paths within the network, as decided by other network devices, without restriction.

In one embodiment, the invention is directed to a network system comprising a first device and a second device separated by a network having asymmetric routes in which traffic forwarded in a first direction from the first device to the second device may travel a different route than traffic forwarded in a second direction from the second device to the first device. At least three intermediate processing devices are located between the first device and the second device, wherein at least two of the intermediate processing devices are located along different ones of the asymmetric routes. The intermediate processing devices establish at least two network tunnels between the intermediate processing devices. The intermediate processing devices intercept a communication flow between the first device and the second device, and encapsulate the communication flow within the network tunnels so that communications associated with the communication flow in the first direction and the second direction are forwarded between a same set of at least two of the intermediate processing devices.

In another embodiment, a method comprises establishing network tunnels between at least three intermediate processing devices located between a first device and a second device separated by a network having asymmetric routes in which traffic forwarded in a first direction from the first device to the second device may travel a different route than traffic forwarded in a second direction from the second device to the first device. The method further comprises intercepting, with a first of one of the intermediate processing devices, a request for a communication flow between the first device and the second device, where the communication flow includes communications from the first device to the second device and return communications from the second device to the first device. The method further comprises intercepting, with a second one of the intermediate processing devices, a response from the second device that acknowledges the request for the communication flow; and encapsulating, with the intermediate processing devices, the communications of the communication flow within the network tunnels so that the communications associated with the communication flow are forwarded through the network between the first one of the intermediate processing devices that intercepted the request and the second one of the intermediate processing devices that intercepted the response.

In another embodiment, the invention is directed to a computer-readable storage medium containing instructions. The instructions cause a programmable processor to intercept a request for a communication flow between a first device and a second device separated by a network having asymmetric routes in which traffic forwarded in a first direction from the first device to the second device may travel a different route than traffic forwarded in a second direction from the second device to the first device. The instructions further cause the processor to encapsulate the communication flow within network tunnels between at least three intermediate processing devices located between the first device and the second device so that communications associated with the communication flow in the first direction and the second direct are forwarded between a same set of at least two of the intermediate processing devices.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
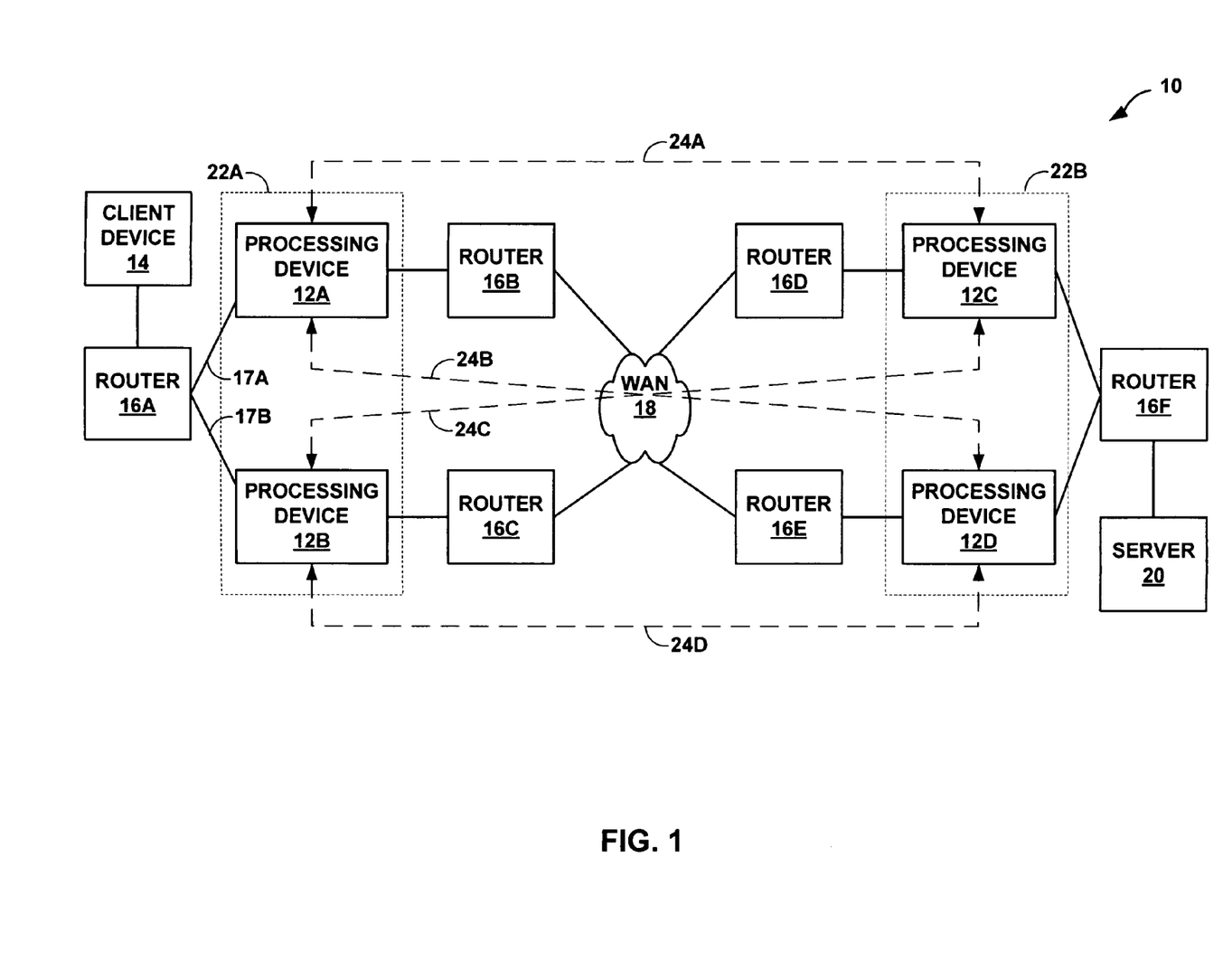
FIG. 1 is a block diagram illustrating an asymmetrical network system in which intermediate processing devices process Transmission Control Protocol (TCP) flows in accordance with the principles of the invention.

FIG. 1 is a block diagram illustrating an asymmetrical network system 10 in which intermediate processing devices 12A-12D ("processing devices 12") process Transmission Control Protocol (TCP) flows in accordance with the principles of the invention. Asymmetrical network system 10 includes client device 14, routers 16A-16F ("routers 16"), Wide Area Network 18 ("WAN 18"), and server 20. An "asymmetrical network system" for purposes of the invention refers to a network in which packets traveling in one direction between two devices may be routed along a different path from packets traveling in the opposite direction between the same two devices. For example, with respect to FIG. 1, based on local routing tables, routers 16 forward packets traveling from client device 14 to server 20 (i.e., from a first device to a second device) along a first path (e.g., 16A→16B→16D→16F) in one direction, and forward the packets traveling in the opposite direction from server 20 to client device 14 along a different path (e.g., 16F→16E→16C→16A).

Asymmetrical network system 10 may comprise an IP network, and asymmetric routing may occur for a variety of reasons, such as differences in link metrics, use of load balancers or other reasons. The techniques are described herein in reference to TCP communications for exemplary purposes, and may readily be applied to other network communication protocols. Moreover, the term "flow" is used herein to refer to the packets associated with the same communication session, e.g., a TCP session, and a single flow includes packets communicated from both the source to the destination and the destination to the source.

In the example of FIG. 1, client device 14 is coupled to router 16A, which in turn is coupled to processing devices 12A, 12B. Processing devices 12A, 12B form a client-side cluster 22A of intermediate devices for TCP flow processing.

In this sense, processing devices 12A, 12B may be viewed as peers, and may communicate with one another by sending "hellos" or other periodic messages to maintain connectivity status. In one embodiment, an administrator (not shown in FIG. 1) may configure cluster 22A such that processing devices 12A, 12B of client-side cluster 22A may communicate with one another, or an auto-discovery process may be used. Each of intermediate processing devices 12A, 12B is coupled to respective routers 16B, 16C, which in turn, are coupled to WAN 18. Client device 14 may be any client-side computing devices used by an individual end user, and may be located within a remote office of an enterprise or other location.

At a central office of the enterprise, for example, routers 16D, 16E are also coupled to WAN 18 and respective intermediate processing devices 12C, 12D. An administrator may also configure processing devices 12C, 12D such that they form a server-side cluster 22B, thereby allowing processing devices 12C, 12D to communicate with one another. In other embodiments, an administrator may not need to manually configure clusters 22A, 22B ("clusters 22"), and intermediate processing devices 12A, 12B and 12C, 12D may respectively auto-detect one another and automatically form clusters 22. In one embodiment, intermediate processing devices 12 output respective advertisement messages that identify destinations serviced by the intermediate processing device. Other intermediate processing devices 12 detect the advertisements, and automatically assign the intermediate processing devices to the first cluster or the second cluster based on the advertisement messages.

Intermediate processing devices 12C, 12D are coupled to router 16F, which in turn couples to server 20. Server 20 represents any resource with which client device 14 established a communications session, such as a TCP connection. Moreover, as explained in further detail below, intermediate processing devices 12 provide transparent processing of TCP flows, such as acceleration or intrusion detection.

Processing devices 12 each represent an intermediate device that transparently monitors and intercepts TCP communications, and may be a firewall device, a virtual private network (VPN) device, a network acceleration device, combinations thereof, and any other device that operates at Open System Interconnection (OSI) layers higher than those necessary to perform internet protocol (IP) communication, i.e., OSI layers above the first two layers of the OSI stack. For ease of illustration, it is assumed below that each of processing devices 12 represents a network acceleration device; however, the principles of the invention should not be limited as such.

In one embodiment, an administrator may configure processing devices 12 in a full mesh configuration, i.e., in a configuration in which each of processing devices 12 may communicate with every other intermediate processing device 12. In other embodiments, processing devices 12 may automatically detect other processing devices and self-configure into a full mesh configuration. Regardless of whether configured by an administrator or automatically configured, intermediate processing devices 12 establish tunnels 24A-24D ("tunnels 24") to facilitate forwarding of TCP communications along defined paths between processing devices 12, and more particularly, between processing devices 12A, 12B of client-side cluster 22A and processing devices 12C, 12D of server-side cluster 22B, regardless of the asymmetric nature of network 10. Although not explicitly illustrated in FIG. 1, processing devices 12A, 12B of client-side cluster 22A may communicate directly with one another, and processing devices 12C, 12D of server-side cluster 22B may communicate directly with one another.

Routers 16 represent any network device capable of facilitating network communications, and although illustrated as routers 16 in FIG. 1, network system 10 may include other types of network devices suited for this purpose, such as switches and hubs. Routers 16 may perform load-balancing operations to balance traffic among the various routes through asymmetrical network system 10. For example, router 16A may monitor WAN access links 17A and 17B that connect router 16A to WAN 18. Depending on the characteristics of each link, such as available bandwidth, router 16A may perform load balance operations to determine which route to WAN 18 should be utilized when sending outbound traffic.

Client device 14 represents any endpoint devices, such as a personal computer, a laptop, a workstation, a wireless device, a personal digital assistant (PDA), a cellular phone, and a network ready appliance. Server 20 comprises any network device capable of servicing Transmission Control Protocol (TCP) requests, such as HyperText Transfer Protocol (HTTP) get requests and File Transfer Protocol (FTP) get requests. While described below in reference to a single client device 14 and a single server 20, the principles of the invention may include a plurality of client devices and servers similar to those illustrated in FIG. 1, or client-to-client or server-to-server communications, and should not be limited to the illustrated embodiment.

In accordance with the principles of the invention, processing devices 12 of client-side clusters 22A and server-side clusters 22B negotiate and establish full-mesh tunnels 24A-24D in which to encapsulate TCP communications. Tunnels 24A, 24B connect intermediate processing device 12A to respective processing devices 12C, 12D, and tunnels 24C, 24D to connect intermediate processing device 12B to respective processing devices 12C, 12D. In some embodiments, processing devices 12 may auto-configure themselves into clusters 22 by registering with a registering processing device, such as intermediate processing device 12A. After forming clusters, processing devices 12 may auto-configure tunnels 24 via an auto-discovery process described in more detail below.

Once configured, processing devices 12 intercept traffic originating from client device 14 and server 20. Client device 14 may, for example, transmit a TCP SYN packet to establish a TCP session with server 20. Router 16A receives the SYN packet, whereupon router 16A may determine to route the SYN packet to intermediate processing device 12A. Intermediate processing device 12A intercepts the SYN packet, determines that the SYN packet initiates a new TCP flow through asymmetric network system 10, and stores information pertinent to this new flow. Next, intermediate processing device 12A selects one of tunnels 24, encapsulates the SYN packet into a payload of a tunnel packet, and forwards the encapsulated SYN packet to one of processing devices 12C and 12D via the selected tunnel. Although each of tunnels 24 is associated with particular source and destination processing devices 12, the encapsulated SYN packet may take any route through WAN 18. That is, tunnels 24 need not specify particular routes through WAN 18, but may direct encapsulated TCP packets to specified destination intermediate processing devices 12.

Upon receiving the SYN packet, intermediate processing device 12C, for example, notifies each other intermediate processing device 12 within server-side cluster 22B, i.e., intermediate processing device 12D, that intermediate processing device 12C has received a SYN packet to establish a new flow. In notifying intermediate processing device 12D, intermediate processing device 12C also indicates that all intercepted TCP communications intercepted associated with the new flow should be sent to intermediate processing device 12A.

In some embodiments, intermediate processing device 12C waits for intermediate processing device 12D to acknowledge this new flow before forwarding the SYN packet to server 20 via router 16F. In other embodiments, intermediate processing device 12C forwards the SYN packet to server 20 concurrent to sending the notice to intermediate processing device 12D. However, in these embodiments, should intermediate processing device 12D receive a SYN ACK packet from server 20 in response to the SYN packet of this new flow, intermediate processing device 12D will refrain from forwarding the SYN ACK packet to client device 14 until intermediate processing device 12D has received notice of the SYN packet from intermediate processing device 12C.

In either case, if intermediate processing device 12C receives the SYN ACK packet response to the SYN packet from server 20, intermediate processing device 12C encapsulates the SYN ACK packet into a tunnel packet and forwards the SYN ACK packet to intermediate processing device 12A via tunnel 24A. Upon receipt of the SYN ACK packet via tunnel 24A, intermediate processing device 12A determines that the flow does not utilize asymmetric routes and forwards the SYN ACK packet to client device 14 via router 16A.

However, in the event intermediate processing device 12D receives the SYN ACK packet response to the SYN packet from server 20, intermediate processing device 12D encapsulates the SYN ACK packet into a tunnel packet, and forwards the encapsulated SYN ACK packet to intermediate processing device 12A via tunnel 24B. Upon receipt of the SYN ACK packet via tunnel 24B, intermediate processing device 12A detects that the TCP flow utilizes asymmetric routes and updates stored flow information to correct for the use of asymmetric routes by indicating within the stored flow information that intermediate processing device 12A should transmit all subsequent flow traffic to intermediate processing device 12D via tunnel 24B. Next, intermediate processing device 12A forwards the SYN ACK packet to client device 14 via router 16A.

In some embodiments, intermediate processing device 12A may intercept subsequent SYN packets establishing TCP flows associated with a previously established TCP flow. These additional flows are herein referred to as "bundled flows." For example, an FTP session between client device 14 and server 20 may require a control flow and a data flow that correspond to one another. Intermediate processing device 12A may intercept a first SYN packet to establish the control flow, followed by another SYN packet to establish the data flow for the same FTP session. In these instances, intermediate processing device 12A may perform substantially the same operations as those described above; however, intermediate processing device 12A groups these flows into bundled flows (i.e., stores data identifying the TCP flows as related to the same FTP session) so as to encapsulate these flows and ensure the bundled flows are handled by the same set of at least two or more of intermediate devices 12.

By doing so, one or more of processing devices 12 may process traffic of a flow, or in the network acceleration context, compress traffic of a flow, so that processing devices 12C, 12D of server-side cluster 22B may perform corresponding operations on the traffic of the flow, or in the network acceleration context, uncompress traffic of the flow. In this manner, intermediate processing devices 12 cooperate to monitor, intercept and encapsulate communications for each TCP flow and encapsulate the TCP communications within tunnels 24 to ensure that the TCP communications flow through the same set of at least two intermediate processing devices, i.e., the intermediate processing device that intercepted the SYN packet forwarded in one direction through the network and the intermediate processing device that intercepted the SYN ACK packet forwarded in the opposite direction. By operating in accordance with the principles of the invention, intermediate processing devices 12 may perform operations, such as compression, acceleration, or intrusion detection, that could not otherwise be performed in an asymmetric network.

Figure 2:
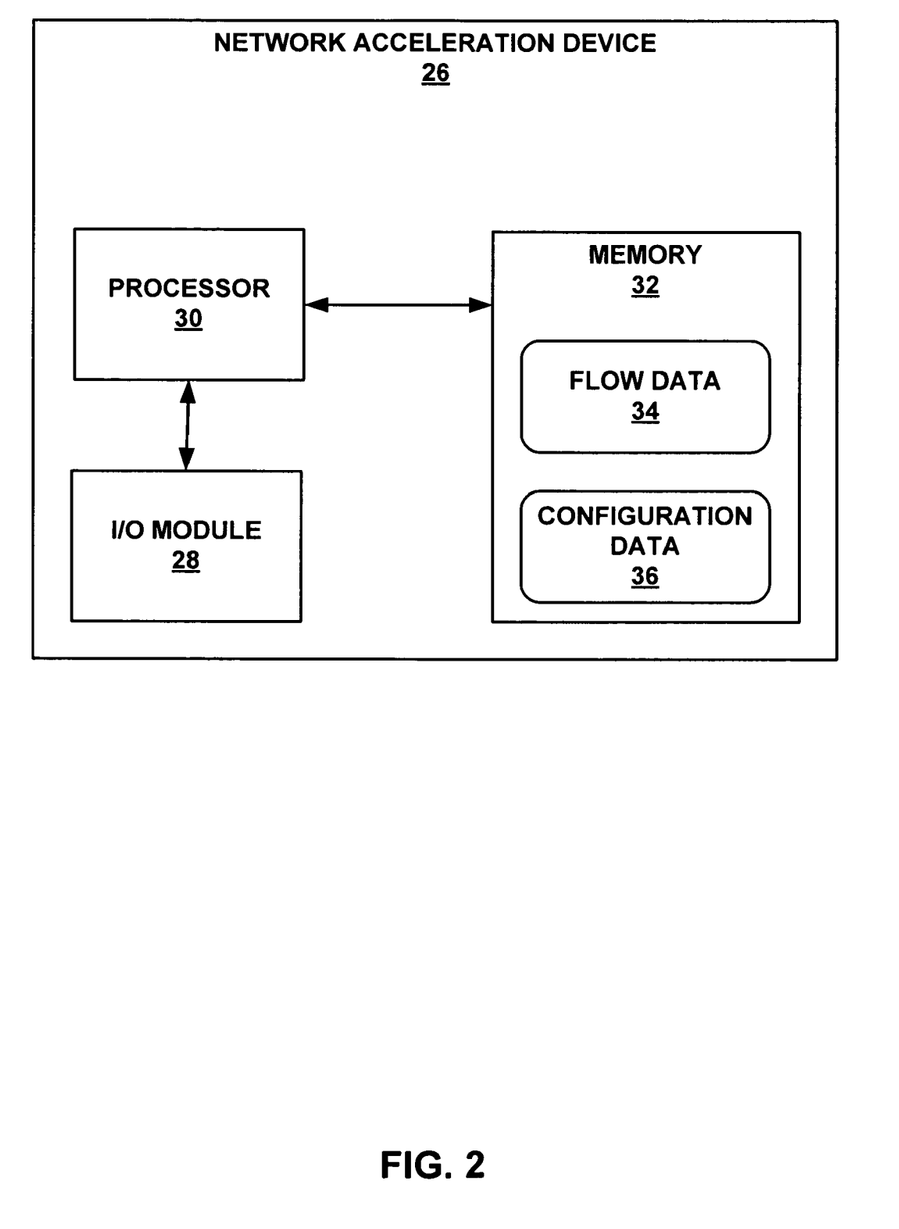
FIG. 2 is a block diagram illustrating an exemplary embodiment of one of the intermediate processing device of FIG. 1, a network acceleration device, which operates in accordance with the principles of the invention.

FIG. 2 is a block diagram illustrating an exemplary embodiment of one of intermediate processing device 12 of FIG. 1. In this example, FIG. 2 illustrates a network acceleration device 26 that operates in accordance with the principles of the invention. Network acceleration device 26 comprises an input/output (I/O) module 28 ("I/O module 28"), a processor 30, and a memory 32. I/O module 28 intercepts traffic within a network, such as asymmetric network system 10. Processor 30 couples to I/O module 28 and processes the intercepted traffic. Processor 30 accesses memory 32 to store and retrieve flow data 34 and configuration data 36. Processor 30 may comprise a programmable processor, and memory 32 may comprise a computer-readable storage medium that stores executable instructions that cause processor 30 to perform the operations described herein. While described herein in reference to network acceleration device 26, processing devices may be other types of intermediate processing devices, such as a VPN device, a firewall device, or any other device that operates at OSI levels at or above those necessary to perform IP communication, as described above.

Either by way of an administrator or through automatic processes described above, network acceleration device 26 is initially configured as a part of a cluster, such as clusters 22, and optionally in a full-mesh configuration with all other pertinent processing devices, such as processing devices 12. Network acceleration device 26 stores this configuration information to configuration data 36. Configuration data 36 may comprise IP addresses serviced by network acceleration device 26, e.g., the IP address of client device 14, tunnel configuration data, and cluster configuration data.

Typical auto-configuration of clusters 22 causes network acceleration device 26 to register with other registering processing device. During registration, network acceleration device 26 may register the IP addresses and its services, such as the IP address of client device 14. The registering processing device or administrator may determine the registered devices that service the same set of IP addresses, and assign those registered devices to the same cluster.

In one embodiment, auto-establishment of a full-mesh configuration may comprise a process whereby, upon receiving a SYN packet, network acceleration device 26 may append or otherwise insert a tag (i.e., metadata) to the SYN packet to identify network acceleration device 26 to any other intermediate processing devices that intercept the SYN packet downstream from network acceleration device 26. If a downstream processing device receives this modified SYN packet, the downstream processing device may initiate a session with network acceleration device 26 to establish a tunnel, such as one of tunnels 24. In this manner, auto-configuration of both clusters and tunnels may occur dynamically and in real-time without requiring an administrator.

After configuration, if network acceleration device 26 comprises a processing device of a client-side cluster, such as intermediate processing device 12A of client-side cluster 22A, I/O module 28 may intercept a TCP packet requesting a new flow, such as a SYN packet, from a client device, such as client device 14. I/O module 28 forwards the SYN packet to processor 30, which may analyze the SYN packet to determine whether the SYN packet comprises a new flow of a bundled flow. In the event the SYN packet comprises a new flow of a bundled flow, processor 30 may update the corresponding bundled flow data stored within flow data 34.

Typically, flow data 34 stores one or more 5-tuples that identify a specific flow or how bundle, wherein each 5-tuple comprises an IP source address, an IP destination address, a source port, a destination port, and a protocol. Thus, to determine whether the SYN packet comprises a new flow of a bundled flow, processor 30 may parse the SYN packet to form a 5-tuple as well as parse other pertinent packet information, perform a lookup within flow data 34, and determine whether the packet 5-tuple relates to any 5-tuples previously stored in flow data 34. In the event the SYN packet does not comprise a new flow of a bundled flow, processor 30 adds the 5-tuple parsed from the SYN packet to flow data 34. In the event the SYN packet does comprise a new flow of a bundled flow, processor 30 updates flow data 34 associated with the bundled flow to include the 5-tuple parsed from the SYN packet.

After adding the new flow to flow data 34, processor 30 encapsulates the SYN packet within another packet to form a tunnel packet specifying a destination address of another intermediate processing device connected to network acceleration device 26 via a tunnel, such as tunnel 24A. Processor 30 next causes I/O module 30 to forward the encapsulated SYN packet along the tunnel to the terminating processing device.

If, instead, network acceleration device 26 comprises a processing device of a server-side cluster, such as intermediate processing device 12C of server-side cluster 22B, I/O module 28 may receive the encapsulated SYN packet, whereupon processor 30 de-encapsulates the SYN packet and adds the new flow to flow data 34. Next, processor 30 causes I/O module 28 to issue a notification to any other processing devices included within the server-side cluster, such as intermediate processing device 12D of server-side cluster 22B. As described above, the notification may inform these other processing devices of the new flow being requested by the SYN packet as well as direct these other processing devices to forward all return traffic corresponding to this new flow to the originating client-side intermediate processing device that intercepted the SYN packet, i.e., intermediate processing device 12A in this example.

If, instead, network acceleration device 26 comprises one of these other server-side processing devices receiving such a notification, e.g., intermediate processing device 12D, I/O module 30 receives this notification. Processor 30 processes the notification by adding an entry for the new flow to flow data 34 and specifying within flow data 34 that all return traffic associated with this new flow should be forwarded over tunnel 24B to the originating client-side intermediate processing device 12A. Upon adding the new flow, processor 30 causes I/O module 28 to output an acknowledgement to the notification.

In the event network acceleration device 26 receives return traffic, e.g., an SYN ACK packet, and assuming network acceleration device 26 comprises one of these other processing devices, e.g., intermediate processing device 12D, I/O module 28 intercepts the SYN ACK packet, whereupon processor 30 parses the SYN ACK packet to determine the 5-tuple. Next, using the parsed 5-tuple, processor 30 performs a look up of flow data 34 using the 5-tuple as the key. Upon finding the corresponding 5-tuple within flow data 34, processor 30 determines that processor 30 should forward the SYN ACK packet to intermediate processing device 12A via tunnel 24B. Subsequently, processor 30 encapsulates the SYN ACK packet within another packet specifying the destination address as that of intermediate processing device 12A. Once encapsulated, processor 30 causes I/O module 28 to forward the packet along tunnel 24B.

Assuming again for illustration purposes that network acceleration device 26 represents intermediate processing device 12A, I/O module 28 receives the encapsulated SYN ACK packet from tunnel 24B. In this case, processor 30 de-encapsulates the SYN ACK packet from the payload of the tunnel packet. After de-encapsulating the packet, processor 30 performs a flow lookup within flow data 34, and determines whether the corresponding SYN packet was sent via the same tunnel as the SYN ACK packet was received. In the event that the SYN packet was forward to server-side cluster 22B via a different tunnel than the tunnel from which the SYN ACK packet was received, processor 30 determines that asymmetric routing has occurred. In response, processor 30 updates flow data 34 to specify that all subsequent out-bound traffic from client device 14 associated with this particular flow should be encapsulated within the same tunnel, tunnel 24B in this example, from which in-bound traffic is received. In this manner, all traffic for a given TCP flow is encapsulated and forwarded between the same intermediate processing devices 12 regardless of direction. Without this guarantee, TCP operations such as transparent compression, encryption, intrusion detection, TCP acceleration, application acceleration and other two-ended services may not be feasible within an asymmetric network.

Figure 3:
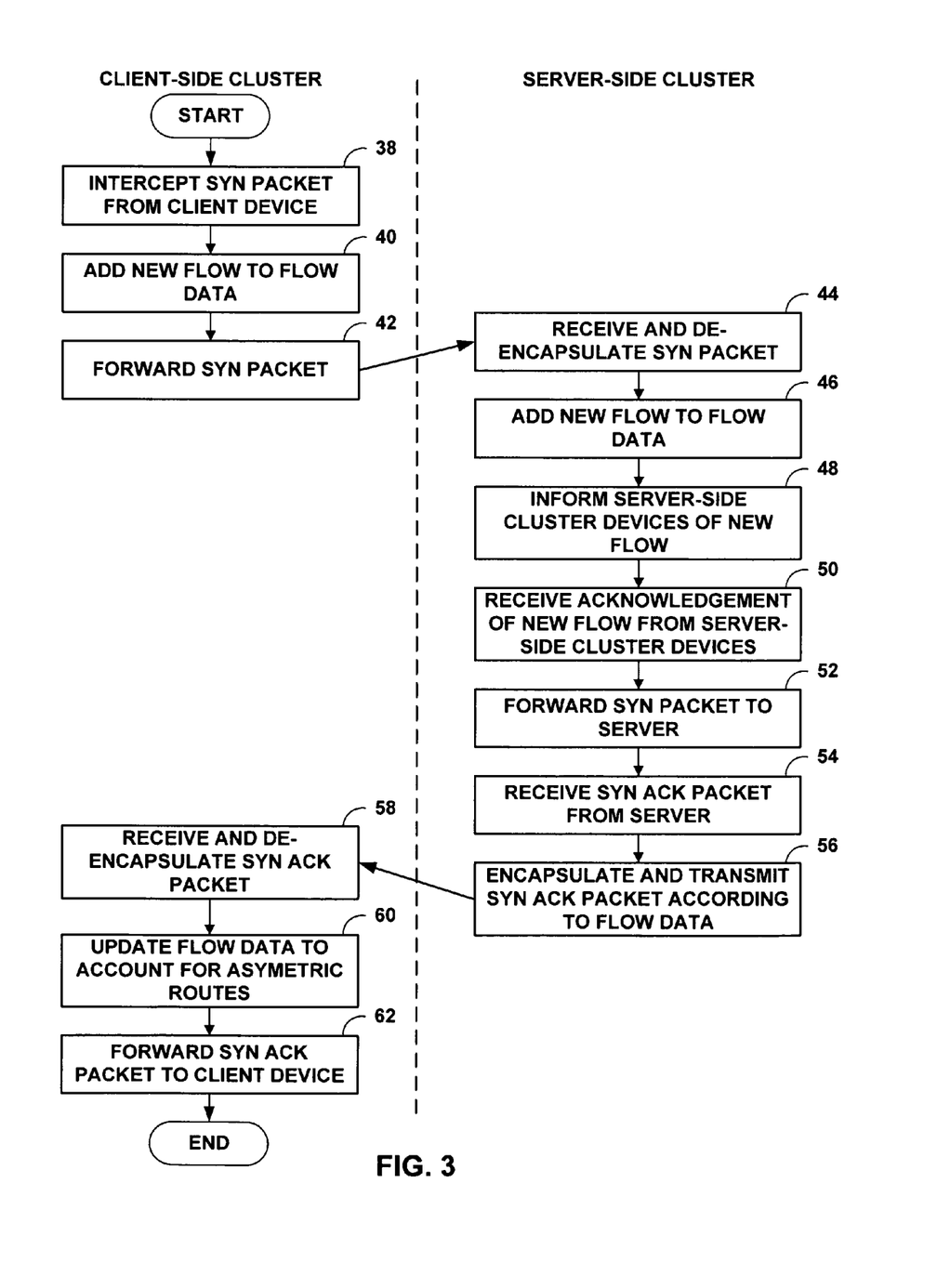
FIG. 3 is a flowchart illustrating exemplary operation of an asymmetric network system, such as the asymmetric network system of FIG. 1, in which an intermediate processing device, such as the network acceleration device of FIG. 2, utilizes overlay tunnels to synchronize flow routing with other processing devices across the network system.

FIG. 3 is a flowchart illustrating exemplary operation of intermediate processing devices within an asymmetric network system, such as asymmetric network system 10 of FIG. 1. For purposes of illustration, it is assumed that each of intermediate processing devices 12 of FIG. 1 comprise network acceleration devices according to FIG. 2. While described in reference to FIGS. 1, 2, the principles of the invention apply to any asymmetric network system in which multiple processing devices require synchronized flow routing to perform transparent network communication enhancements, such as compression, acceleration and intrusion detection, i.e., services transparent to both of the ends of the communication.

Initially, as described above, an administrator may configure intermediate processing devices 12 in full-mesh configuration having point-to-point tunnels sourced and terminated at the respective devices. Alternatively, intermediate processing devices 12 may perform the described self-detection and auto-configuration process.

Once configured, a client device, such as client device 14 may output a SYN packet destined for server 20 that is intercepted by intermediate processing device 12A of client-side cluster 22A (38). Assuming for purposes of illustration that intermediate processing device 12A comprises network acceleration device 26, I/O module 28 intercepts the SYN packet, whereupon processor 30 parses the packet to identify the corresponding flow information and adds a new flow to flow data 34, as described above (40). In some embodiments, processor 30 may determine whether the new flow corresponds to a bundled flow and update the bundled flow with the new flow.

Once processor 30 adds the new flow, processor 30 directs I/O module 30 to output the SYN packet to one of processing devices 12C, 12D of server-side cluster 22B in accordance with a local routing table (42). In other words, processor 30 forwards the SYN packet to be routed through WAN 18 through either tunnel 24A or tunnel 24B, with the choice of tunnel being made using any criteria, including always choosing a particular tunnel or choosing tunnels so that on average each tunnel gets the same number of SYN packets.

Next, for purposes of illustration, server-side intermediate processing device 12C receives and de-encapsulates the SYN packet (44). I/O module 28 of the server-side intermediate device 12C receives the encapsulated SYN packet, whereupon processor 30 of that intermediate device 12C extracts the SYN packet from the payload of the tunnel packet and adds a new flow to flow data 34 (46). Processor 30 of server-side intermediate device 12C also causes I/O module 28 to issue a notification that informs all of the other processing devices of server-side cluster 22B, i.e., intermediate processing device 12D, of the new flow (48).

In some embodiments, processor 30 of the server-side device 12C may delay forwarding the SYN packet to server 20 until after receiving acknowledgements that each of the other intermediate processing devices 12 included within server-side cluster 22B has recorded the new flow that is being established. Assuming processor 30 of the server-side device 12C receives an acknowledgement from all other intermediate processing devices 12 included within server-side cluster 22B, processor 30 forwards the SYN packet to server 20 (50, 52). Server 20 processes the SYN packet and responds by transmitting a SYN ACK packet, which router 16F may route either to intermediate processing device 12C or 12D.

In the event intermediate processing device 12C intercepts the SYN ACK packet from server 20 (54), processor 30 of intermediate processing device 12C encapsulates and transmits the SYN ACK packet via tunnel 24A (56). Similarly, in the event intermediate processing device 12D intercepts the SYN ACK packet from server 20, intermediate processing device 12D encapsulates and transmits the SYN ACK packet via tunnel 24B.

In response, I/O module 28 of intermediate processing device 12A receives the SYN ACK packet, whereupon processor 30 de-encapsulates the SYN ACK packet (58). Processor 30 of intermediate device 12A compares the tunnel used to encapsulate the outbound SYN packet with the tunnel from which the SYN ACK packet was received to determine whether an asymmetric route exists. In the event that the packets arrived via an asymmetric route, processor 30 updates flow data 34 to record the source of the encapsulated SYN ACK packet to account for the asymmetric route (60). Finally, processor 30 directs I/O module 28 to forward the de-encapsulated SYN ACK packet to client device 14 via router 16A (62).

Once the requested TCP flow is established, the set of intermediate processing devices encapsulate the communications of the flow as payloads of tunnel packets, and forward the tunnel packets to the same intermediate processing devices that intercepted the request and the response. In this manner, processing devices 12, as described in reference to network acceleration device 26, ensures TCP communications for a given TCP flow are directed to the same set of client-side and server-side intermediate processing devices regardless of any asymmetric nature of the intermediate network. This set of intermediate processing devices then extracts the TCP communications from the tunnels, and jointly processes the TCP communications to provide transparent, enhanced communications.

Figure 4:
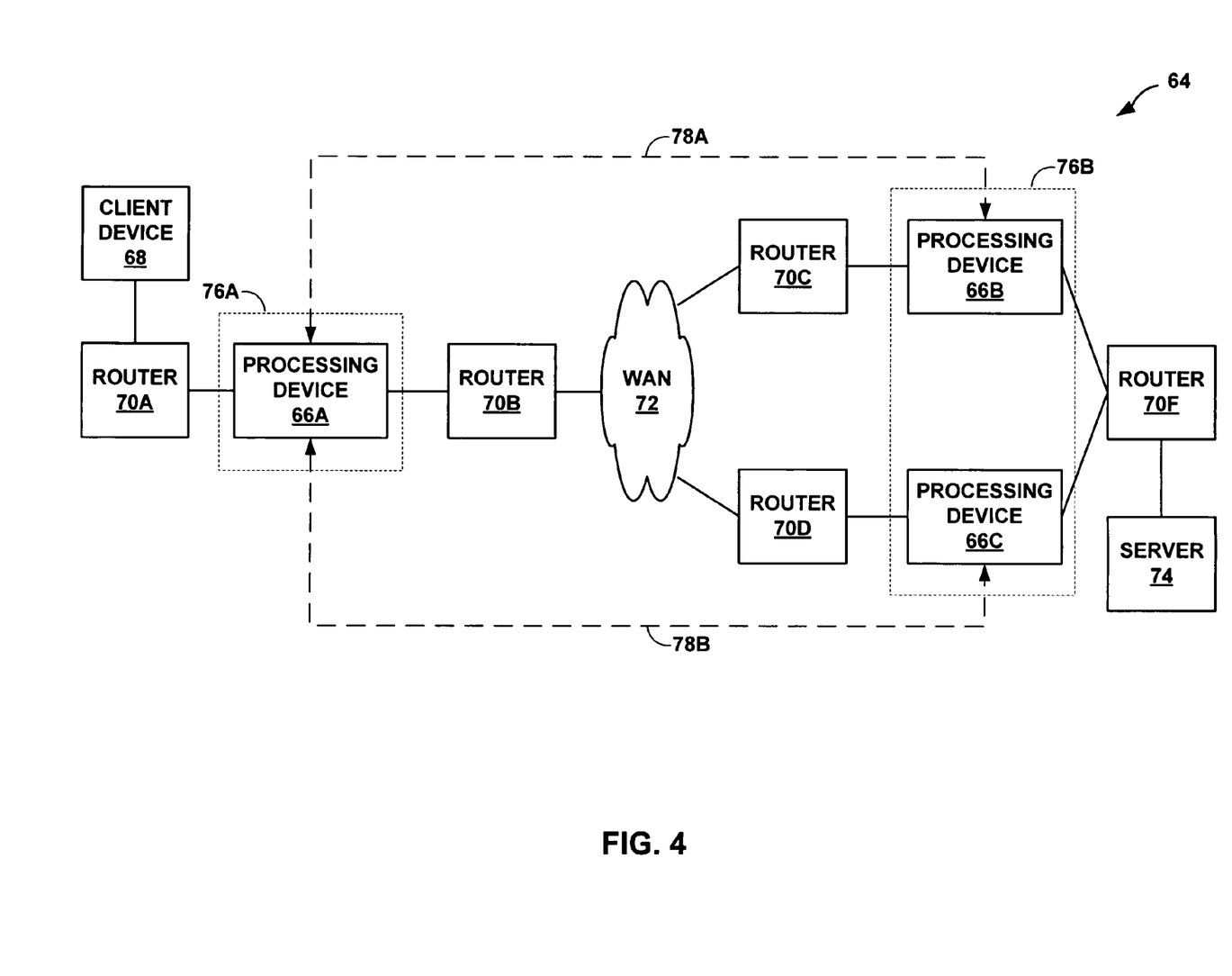
FIG. 4 is a block diagram illustrating another exemplary asymmetric network system in which processing devices process Transmission Control Protocol (TCP) flows in accordance with the principles of the invention.

FIG. 4 is a block diagram illustrating another exemplary asymmetric network 64 in which intermediate processing devices 66A-66C ("processing devices 66") transparently process Transmission Control Protocol (TCP) flows in accordance with the principles of the invention. Similar to asymmetric network system 10 of FIG. 1, asymmetric network system 64 includes a client device 68, routers 70A-70F ("routers 70"), WAN 72, and server 74.

In the example of FIG. 4, client-side cluster 76A includes a single processing device 66A. Processing devices 66B, 66C, similar to processing devices 12C, 12D of FIG. 1, have been configured in a server-side cluster 76B. Moreover, processing devices 66 have been configured in a full-mesh configuration, and in particular, have been configured such that respective tunnels 78A, 78B ("tunnels 78") provide mechanisms for directing encapsulated TCP flows between processing device 66A and respective processing devices 66B, 66C. Consequently, FIG. 4 serves to illustrate by way of example that any number N of client-side intermediate processing devices may be used with any number M of server-side intermediate processing devices, and an N×M mesh of tunnels can be established between the intermediate devices to provide a mechanism to direct TCP communications of the same TCP flow to the same client-side or service side intermediate device for enhanced joint processing by the same devices.

Initially, client device 68 forwards a SYN packet to router 70A, which in turn forwards the SYN packet along asymmetric network system 64. As described above, processing device 66A intercepts the SYN packet, parses the packet, and adds the new flow to flow data stored within processing device 66A. Next, processing device 66A forwards the SYN packet to either one of processing devices 66B or 66C via respective one of tunnels 78 by encapsulating the SYN packet within another packet.

Assuming processing device 66B receives the encapsulated SYN packet via tunnel 78A, it de-encapsulates the packet, parses the packet, and adds the new flow to flow data stored within processing device 66B, as described above. While performing these operations, processing device 66B also transmits a notification to the other processing devices of server-side cluster 76B, i.e., processing device 66C, informing them of the new flow and where to send return traffic associated with the flow, i.e., to processing device 66A. As described above, in some embodiments, processing device 66B waits until receiving an acknowledgement to this notification, while in other embodiments, processing device 66B may immediately forward the SYN packet. In any event, processing device 66B transmits the SYN packet to server 74 via router 70F.

Upon receiving the SYN packet, server 74 outputs a SYN ACK packet in response. Router 70F may forward either to processing device 66B or 66C. The receiving processing device 66B or 66C receives the SYN ACK packet, parses the packet and performs a lookup of its flow data to determine the flow to which the SYN ACK packet corresponds. The intermediate processing device 66C, in this example, determines the SYN ACK packet should forward to processing device 66A via tunnel 78B and forwards the SYN ACK packet via tunnel 78B by encapsulating the SYN ACK packet within another packet. Processing device 66A receives the encapsulated SYN ACK packet, de-encapsulates the packet, and determines whether the flow comprises asymmetric routes, as described above. In this instance the flow does comprise asymmetric routes, and therefore, processing device 66A updates its flow data corresponding to this flow to account for the asymmetric routes. In other words, processing device 66A updates the flow data to indicate that processing device 66A should forward all subsequent traffic associated with this flow to processing device 66C via tunnel 78B. In this manner, intermediate processing devices 66 ensure that every flow comprises symmetric routes or, in other words, outbound and inbound traffic flows between the same two of processing devices 66 for each flow.

Various embodiments of the invention have been described. These and other embodiments are within the scope of the following claims.

The invention claimed is:

1. A method comprising:
    establishing network tunnels between at least three intermediate processing devices located between a first device and a second device separated by a network having asymmetric routes in which traffic forwarded in a first direction from the first device to the second device travels a different route than traffic forwarded in a second direction from the second device to the first device, wherein the at least three intermediate processing devices includes a first intermediate processing device associated with the first device, and second and third intermediate processing devices associated with the second device, and wherein establishing network tunnels comprises establishing a first tunnel between the first intermediate processing device and the second intermediate processing device and establishing a second tunnel between the first intermediate processing device and the third intermediate processing device;
    intercepting, with the first intermediate processing device, a request for a communication flow between the first device and the second device, wherein the communication flow includes communications from the first device to the second device and return communications from the second device to the first device;
    after intercepting the request with the first intermediate processing device, forwarding the request from the first intermediate processing device to the third intermediate device via the second tunnel;
    when the third intermediate processing device receives the request, forwarding a notification from the third intermediate processing device to the second intermediate processing device to inform the second intermediate processing device of the communication flow being requested, wherein the notification includes information specifying the requested flow and information identifying the first intermediate processing device that intercepted the request;
    forwarding the request from the third intermediate device to the second device;
    intercepting, with the second intermediate processing device, a response from the second device that acknowledges the request for the communication flow; and
    encapsulating, with the intermediate processing devices, the communications of the communication flow within the network tunnels so that the communications associated with the communication flow are forwarded through the network between the first intermediate processing device that intercepted the request and the second intermediate processing device that intercepted the response.

2. The method of claim 1, wherein the request comprises a Transmission Control Protocol (TCP) SYN packet, and the response comprises a TCP SYN ACK packet.

3. The method of claim 1, further comprising:
    assigning the first intermediate processing device to a first cluster; and
    assigning the second and third intermediate processing devices to a second cluster.

4. The method of claim 3, further comprising:

detecting with the intermediate processing devices advertisement messages that identify destinations serviced by the other intermediate processing devices; and automatically assigning the intermediate processing devices to the first cluster or the second cluster based on the advertisement messages.

5. A method comprising:

establishing network tunnels between at least three intermediate processing devices located between a first device and a second device separated by a network having asymmetric routes in which traffic forwarded in a first direction from the first device to the second device travels a different route than traffic forwarded in a second direction from the second device to the first device, wherein the at least three intermediate processing devices includes a first intermediate processing device associated with the first device, and second and third intermediate processing devices associated with the second device, and wherein establishing network tunnels comprises establishing a first tunnel between the first intermediate processing device and the second intermediate processing device and establishing a second tunnel between the first intermediate processing device and the third intermediate processing device;

intercepting, with the first intermediate processing devices, a request for a communication flow between the first device and the second device, wherein the communication flow includes communications from the first device to the second device and return communications from the second device to the first device;

after intercepting the request with the first intermediate processing device, updating flow data stored within the first intermediate processing device to add the flow being requested and forwarding the request from the first intermediate processing device in accordance with a local routing table of the first intermediate device;

when the third intermediate processing device receives the request, forwarding a notification from the third intermediate processing device to the second intermediate processing device to inform the second intermediate processing device of the communication flow being requested;

receiving the notification with the second intermediate processing device;

in response to the notification, determining an identity of the first intermediate processing device that intercepted the request based on the notification;

intercepting, with the second intermediate processing device, a response from the second device that acknowledges the request for the communication flow;

forwarding the intercepted response from the second intermediate processing device to the first intermediate processing device via the first tunnel;

updating flow data stored within the second intermediate processing device to add the flow being requested and to specify that communications of the flow are to be forwarded via the first tunnel;

forwarding, as encapsulated packets via the first tunnel, communications of the flow from the second intermediate processing device to the first intermediate processing device.

6. The method of claim 5, further comprising:

upon receiving the intercepted response with the first intermediate processing device via the first tunnel, performing the following with the first intermediate processing device;

determining an identity of the second intermediate processing device that intercepted the response;

determining whether the request and response traveled asymmetric routes; and when the request and response traveled asymmetric routes, updating flow data within the first intermediate processing device to specify that communications of the flow are to be forwarded via the first tunnel and forwarding, as encapsulated packets via the first tunnel, communications of the flow from the first intermediate processing device to the second intermediate processing device.

7. A network system comprising:

a first device and a second device separated by a network having asymmetric routes in which traffic forwarded in a first direction from the first device to the second device travels a different route than traffic forwarded in a second direction from the second device to the first device;

at least three intermediate processing devices located between the first device and the second device, wherein the at least three intermediate processing devices includes a first intermediate processing device associated with the first device, and second and third intermediate processing devices associated with the second device, wherein the second and third intermediate processing devices are each located on a different one of the asymmetric routes; and a first tunnel between the first intermediate processing device and the second intermediate processing device and a second tunnel between the first intermediate processing device and the third intermediate processing device;

wherein the first intermediate processing device is configured to intercept a request for a communication flow between the first device and the second device and forward the request to the third intermediate device via the second tunnel, wherein, the third intermediate processing device is configured to receive the request, forward the request from the third intermediate device to the second device, and forward a notification to the second intermediate processing device to inform the second intermediate processing device of the communication flow being requested, wherein the notification includes information specifying the requested flow and information identifying the first intermediate processing device that intercepted the request, and wherein the second intermediate device is configured to intercept a response from the second device that acknowledges the request for the communication flow and encapsulate communications of the communication flow within the first network tunnel so that the communications associated with the communication flow are forwarded through the network between the first intermediate processing device that intercepted the request and the second intermediate processing device that intercepted the response.

8. The network system of claim 7, wherein the first intermediate processing devices comprises a memory that stores flow data, and wherein the first intermediate processing device updates the flow data stored within memory to add the flow being requested.

* * * * *

UNITED STATES PATENT AND TRADEMARK OFFICE
CERTIFICATE OF CORRECTION

PATENT NO. : 7,653,075 B2 Page 1 of 1
APPLICATION NO. : 11/434416
DATED : January 26, 2010
INVENTOR(S) : Singh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 720 days.

Signed and Sealed this

Twenty-third Day of November, 2010

David J. Kappos
*Director of the United States Patent and Trademark Office*